(12) United States Patent
Haverkamp et al.

(10) Patent No.: US 8,032,740 B2
(45) Date of Patent: *Oct. 4, 2011

(54) UPDATE IN-USE FLASH MEMORY WITHOUT EXTERNAL INTERFACES

(75) Inventors: Frank Haverkamp, Tuebingen (DE);
Gerald Kreissig, Herrenberg (DE);
Joshua W. Boyer, Rochester, MN (US);
Shaun A. Wetzstein, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/166,182

(22) Filed: Jul. 1, 2008

(65) Prior Publication Data

US 2008/0263350 A1 Oct. 23, 2008

Related U.S. Application Data

(63) Continuation of application No. 11/013,680, filed on Dec. 16, 2004, now Pat. No. 7,409,538.

(30) Foreign Application Priority Data

Dec. 18, 2003 (EP) .................................... 03104809

(51) Int. Cl.
*G06F 9/00* (2006.01)
*G06F 12/00* (2006.01)
*G06F 9/44* (2006.01)
*G06F 9/445* (2006.01)

(52) U.S. Cl. ............... 713/2; 713/1; 713/100; 711/101; 711/170; 717/168; 717/174

(58) Field of Classification Search ................ 713/1, 2, 713/100; 711/101, 170; 717/168, 174
See application file for complete search history.

(56) References Cited

U.S. PATENT DOCUMENTS

| | | | |
|---|---|---|---|
| 5,884,074 A | 3/1999 | Maeda et al. |
| 5,930,504 A | 7/1999 | Gabel |
| 5,933,595 A | 8/1999 | Iizuka et al. |
| 6,343,379 B1 | 1/2002 | Ozawa et al. |
| 6,760,908 B2 | 7/2004 | Ren |
| 7,409,538 B2 | 8/2008 | Haverkamp et al. |
| 2003/0233558 A1 | 12/2003 | Lieberman et al. |

OTHER PUBLICATIONS

Office Action 1, Jun. 20, 2007, for U.S. Appl. No. 11/013,680, Total 15 pp.
Amendment 1, Sep. 19, 2007, for U.S. Appl. No. 11/013,680, Total 11 pp.
Final Office Action 1, Dec. 10, 2007, for U.S. Appl. No. 11/013,680, Total 12 pp.
Amendment 2, Feb. 11, 2008, for U.S. Appl. No. 11/013,680, Total 7 pp.

(Continued)

*Primary Examiner* — Stefan Stoynov
(74) *Attorney, Agent, or Firm* — William Konrad; Konrad Raynes and Victor LLP

(57) ABSTRACT

A method, apparatus and program storage device for updating a non-volatile memory in an embedded system is provided. The invention includes detaching the non-volatile memory from all expectable non-volatile memory references, creating a temporary, volatile-memory file system for allocation of volatile memory space as needed for the non-volatile memory update process, copying all procedural code required to perform the non-volatile memory update into the volatile memory, changing the system search path definitions temporarily to point to the volatile memory, and performing the non-volatile memory update.

18 Claims, 3 Drawing Sheets

OTHER PUBLICATIONS

Advisory Action, Feb. 22, 2008, for U.S. Appl. No. 11/013,680, Total 3 pp.

Amendment 3, Mar. 10, 2008, for U.S. Appl. No. 11/013,680, Total 8 pp.

Notice of Allowance 1, Mar. 31, 2008, for U.S. Appl. No. 11/013,680, Total 6 pp.

UPDATE IN-USE FLASH MEMORY WITHOUT EXTERNAL INTERFACES

RELATED CASES

This application is a continuation application of application Ser. No. 11/013,680, filed Dec. 16, 2004, assigned to the assignee of the present application, and is incorporated by reference in its entirety.

BACKGROUND OF THE INVENTION

1. Field of the Invention

The present invention relates generally to embedded computing systems, and more particularly to updating a non-volatile memory in an embedded system.

2. Description of Related Art

Embedded computing systems often have limited processing and storage resources, and are basically dedicated for running a single program application, which is usually error-free and calculable for all relevant use situations during operation. For example, methods have been developed for updating a flash memory of a computer system that reserve such update hardware in the form of a certain additional memory area in an additional "locked" memory space in order to provide such security against update failures.

A disadvantage of such embedded computing systems is that the updating process requires a service provider to connect separately to each embedded system. For example a 1:1 relationship between a service provider and an embedded system is generally required. This results in a tax on resources, and as the number of systems to be updated increases, resources are taxed for longer periods.

Generally, as both computing resources and storage resources are restricted in size and performance in embedded systems, a flash memory in an embedded system controller provides efficiencies by providing a persistent media for storing purposes (applications, user data, application environment), and by serving as an execution media. The term "Flash" memory in the present invention means any non-volatile memory used to store either data and/or programs. Thus, it may also include a battery-buffered volatile memory, and other forms of non-volatile RAM. For example, when the system is booted, the processor will start to execute the bootstrap code out of the flash memory. Afterwards an operating system is loaded from said flash memory into the RAM, for example, a dynamic random access memory (DRAM) device, and is executed. Applications often do not need to be loaded completely into DRAM devices because the operating system (OS) provides mechanisms of on-demand loading of code pages. As a result, some DRAM space is saved because it is unnecessary to copy all the application code from flash memory into DRAM.

This dual use, however, creates problems when the flash memory should be updated. While a program is executed, it will generate page faults, which cause the OS to load the missing code out of the flash memory into the DRAM. This makes it impossible to update the application memory area of the flash memory with a newer version of the program. In order to do so, the program must be stopped and unloaded. Then the flash memory, which was used by the program, can be updated. But this approach is not possible for those memory areas which are permanently in use for critical programs, for example, an initial application like "init" in UNIX™ or Linux™ systems and the associated shared libraries like "glibc". In these cases it is impossible to stop and unload the applications and libraries to make the used flash space available for updating. Since these programs are usually loaded at boot time, it can only be unloaded at boot time with a new boot. However, at boot time it is usually not possible to select where these programs should be placed. Therefore, it is not possible to update these flash memory areas in-band, i.e., by the aid of a functional path under use of the own embedded system processor.

There are three solutions for this situation. Prior art provision of an external hardware path into the system can be used, which allows the flash memory to update without the need to boot the system or to run programs. Alternatively, additional redundant flash memory, i.e., a second flash memory bank, which holds a backup copy of the programs can be used. In case of a code update, this version is written first, and then the system is rebooted with the indicator to fetch the programs from the 2nd flash bank. When this bank is booted, the flash space of the 1st bank can be overwritten. Another solution includes usage of additional DRAM to store the critical applications, making an update of the flash memory possible at any time.

All three solutions are expensive, because they require either additional hardware circuitry, duplicate the amount of necessary flash memory or increase the needed DRAM space significantly. In particular, for embedded systems, which are required to remain on low-price level, such additional costs can hardly be tolerated. It can be seen then that there is a need for a method, apparatus and program storage device for updating a non-volatile memory in an embedded system.

SUMMARY OF THE INVENTION

To overcome the limitations described above, and to overcome other limitations that will become apparent upon reading and understanding the present specification, the present invention discloses a method, apparatus and program storage device for updating in-use flash memory without external interfaces.

In one embodiment of the invention, a method for updating a non-volatile memory in an application environment of an embedded computing system is provided. The method requires detaching the non-volatile memory from all expectable non-volatile memory references, creating a temporary, volatile-memory file system for allocation of volatile memory space as needed for the non-volatile memory update process, copying all procedural code required to perform the non-volatile memory update into the volatile memory, changing the system search path definitions temporarily to point to the volatile memory, and performing the non-volatile memory update.

In another embodiment of the invention, a program storage device readable by a computer is provided. The program storage device tangibly embodies one or more programs of instructions executable by the computer to perform operations for updating a non-volatile memory in an application environment of an embedded computing system. The operations include detaching the non-volatile memory from all expectable non-volatile memory references, creating a temporary, volatile-memory file system for allocation of volatile memory space as needed for the non-volatile memory update process, copying all procedural code required to perform the non-volatile memory update into the volatile memory, changing the system search path definitions temporarily to point to the volatile memory, and performing the non-volatile memory update.

In another embodiment of the invention, a device for updating a non-volatile memory in an application environment of an embedded computing system is provided. The device includes a memory for storing data therein and a processor configured for detaching the non-volatile memory from all expectable non-volatile memory references, creating a temporary, volatile-memory file system for allocation of volatile memory space as needed for the non-volatile memory update process, copying all procedural code required to perform the non-volatile memory update into the volatile memory, changing the system search path definitions temporarily to point to the volatile memory, and performing the non-volatile memory update.

In yet another embodiment of the present invention, a system for updating a non-volatile memory in an application environment of an embedded computing system is provided that includes means for detaching the non-volatile memory from all expectable non-volatile memory references, means for creating a temporary, volatile-memory file system for allocation of volatile memory space as needed for the non-volatile memory update process, means for copying all procedural code required to perform the non-volatile memory update into the volatile memory, means for changing the system search path definitions temporarily to point to the volatile memory, and performing the non-volatile memory update.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

Figure 1:
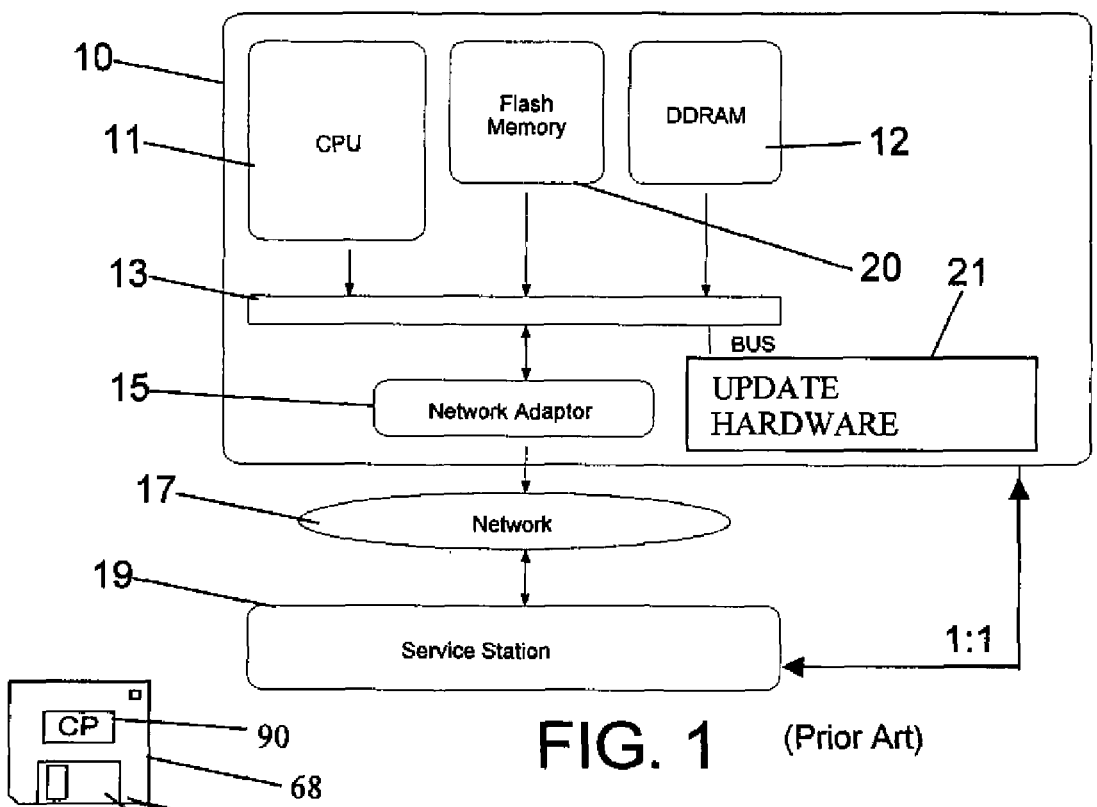
FIG. 1 illustrates components of a prior art embedded system including its external network interface to a flash memory update source.

FIG. 1 illustrates components of a prior art embedded system including its external network interface to a flash memory update source, e.g., the IBM P 690 Regatta Server systems. The embedded system of FIG. 1 includes an "embedded controller" 10, such as a service controller, which is occupied to provide help, i.e., to keep the system in an operational state, when particular system resources should fail. A central processing unit 11 (CPU), a non-volatile memory 20, and a random access memory 12 (RAM) are connected to an external I/O interface via a bus system 13, or are connected to network 17 and to peripheral operational devices (not depicted), via network adapter 15, for example. An update server 19 of a service provider for updating the non-volatile memory is connectable to the embedded system via said network. "update hardware" 21 can be provided, in order to be technically capable to perform the update process. This hardware 21 may be an external interface, or an additional memory unit, which stores content of the non-volatile memory in a redundant way, such that, in case the update procedure should fail, the system may be rebooted from this redundant hardware.

Figure 2:
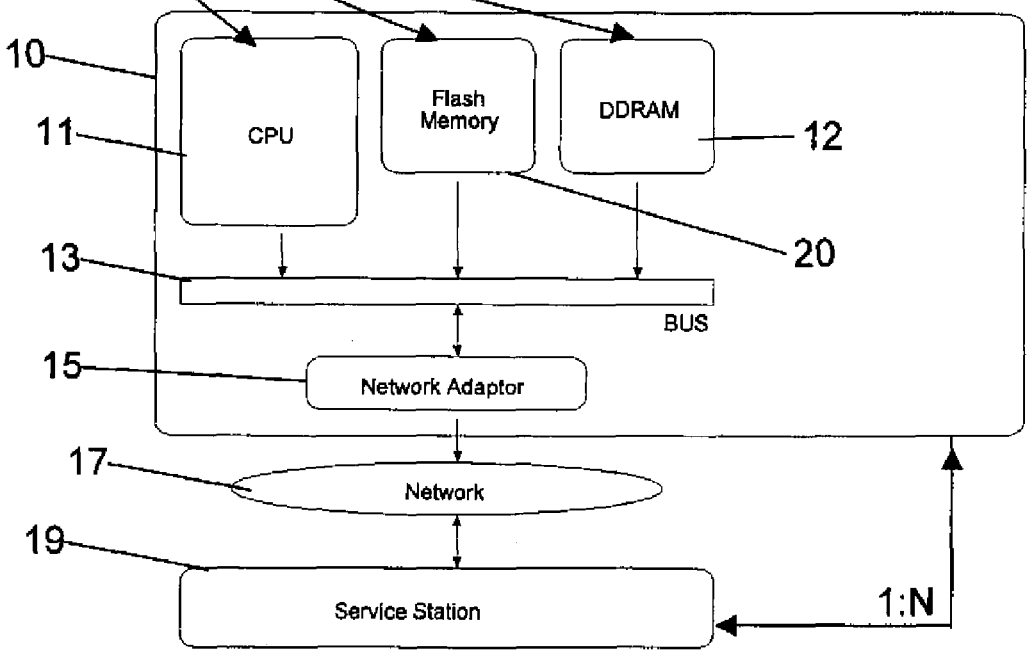
FIG. 2 illustrates an embedded system in accordance with an embodiment of the present invention.

FIG. 2 illustrates an exemplary embedded system in accordance with an embodiment of the present invention. Compared to FIG. 1, the instant embodiment of the present invention does not comprise the before-mentioned update hardware 21. Removing the update hardware 21 renders the 1:1 relationship present in FIG. 1 for performing a flash update, to a 1:N relationship, in which plurality of N (nearly unlimited in number) non-volatile memories of N embedded systems can be updated in one run, controlled by the Service provider 19.

In FIG. 2, volatile memory 12 is used for running the basic application program, and the non-volatile memory 20 is used for storing an application environment, including for example, a BIOS memory, an operating system, user data, program customization data, firmware etc. To perform the update of the non-volatile memory 20, the non-volatile memory update applications are freed from being dependent on the execution from non-volatile memory 20 by establishing a temporary, new and limited execution context in the DRAM space 12. Since the available resources do not allow the load of the complete system images, the temporary execution context must be fully operational to access the image via the functional path. The update data can be received, for example, over a TCP/IP based network 17 (streaming). This allows an update of all non-volatile memory locations and to do a complete system update, including those non-volatile memory regions, which were previously occupied with a minimum of available system resources. After successfully updating the non-volatile memory 20, the system is reset and the updated applications are executed out of non-volatile memory 20 again.

In addition, as an alternative, all applications accessing the flash memory 20 must be stopped or brought into a safe state at the time a flash update is requested, where they no more access the flash memory 20. All applications which are necessarily required to run even while doing a flash update, for example, a watchdog supervising program, must be loaded completely into DRAM 12 into a temporary area like a RAM-disk for example (not shown). Using this procedure, it is possible to perform the update the complete content of the flash memory 20 in one run followed by one reboot at the end bringing the system into an operational state after the update.

Yet further, the flash memory update information may be transferred in an encoded form via a network 17, in order to increase privacy and thus system stability. The information may be decoded by the embedded system itself, right before performing the flash update procedure.

Thus, according to an embodiment of the present invention, software is used to update a complete non-volatile memory 20. For example, a non-volatile memory in an embedded system may be updated without additional "update-dedicated" hardware, thus allowing critical areas in the non-volatile memory 20 to be updated in-band, if they are not assigned during boot and run time.

Figures 3A, 3B:
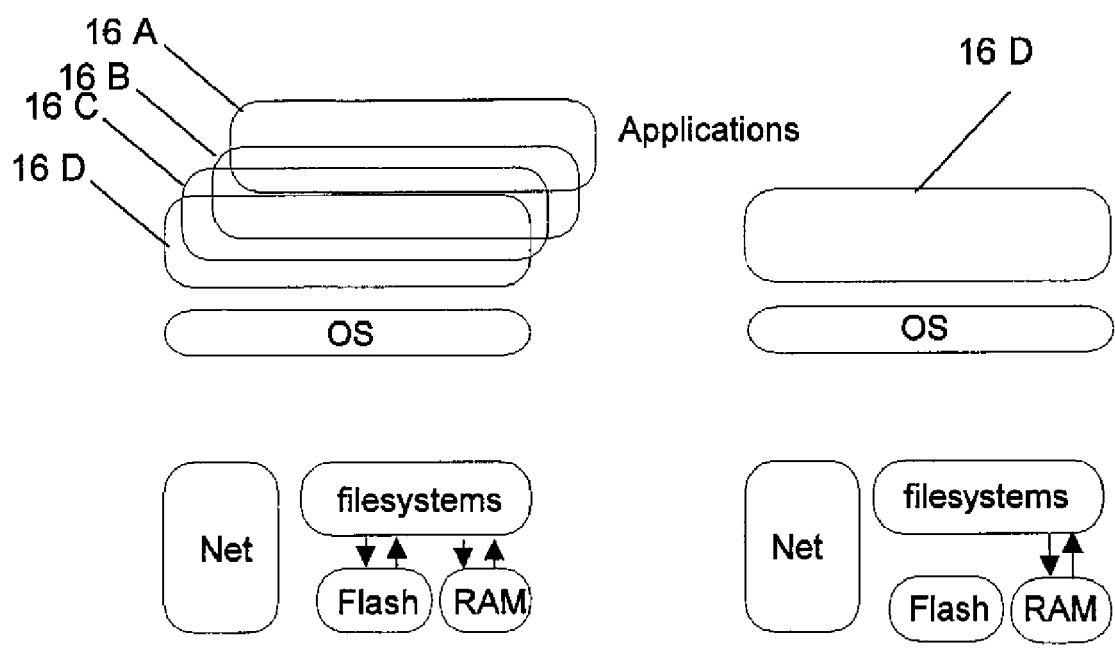
FIG. 3a is a more detailed schematic structural representation of components of a prior art embedded system.
FIG. 3b is a schematic structural representation of relevant components of an embedded system with a functional deflection of the flash memory references from the flash memory during the flash update in accordance with an embodiment of the invention.

FIG. 3a is a more detailed schematic structural representation of components of a prior art embedded system. FIG. 3a illustrates the file system is accessed by the volatile RAM and the flash memory, respectively (bold arrows). Four programs 16 A, B, C and D are run.

FIG. 3b is a schematic structural representation of relevant components of an embedded system with a functional deflection of the flash memory references from the flash memory during the flash update in accordance with an embodiment of the invention. In FIG. 3b, the update process temporarily cuts off any accesses from and to the flash memory triggered by any other functional unit, as it is the file system for example, in order to "encapsulate" the flash memory and to prepare it for the update process in accordance with an embodiment of the present invention. Thus, this isolated flash memory is shown on the right hand side in FIG. 2. Further, only one program 16D is run, the others are aborted. This state is valid immediately before and during the update process in accordance with an embodiment of the invention until a reboot is performed with the updated flash memory using the new flash content again for normal operation. More details for an exemplary flash update are given with reference to FIG. 4 by aid of an example implemented for a LINUX-based embedded system used as an internal system controller for large computer system management and repair actions. This may be used for improvement of a system such as the above-mentioned IBM P 690 Regatta Server systems.

Figure 4:
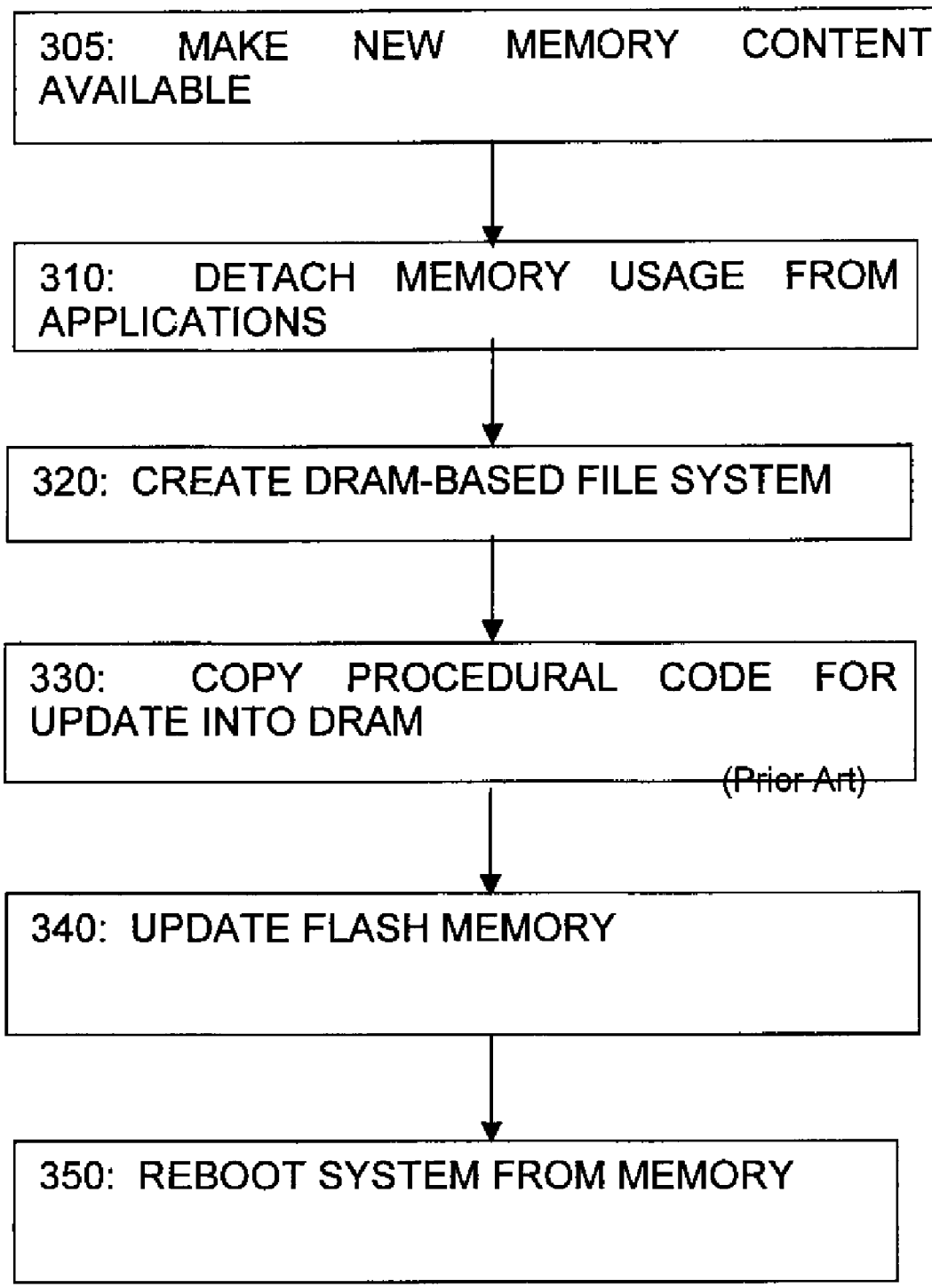
FIG. 4 is a schematic functional overview representation of relevant steps in the control flow in the flash update procedure of the present invention.

FIG. 4 is a flowchart representation of a method for performing the memory update procedure in accordance with an embodiment of the invention. Before the update process begins, the new memory content is made available 305 using a network connection via a network adapter. This allows verification that the new flash memory content, for example, has a valid flash file header. A CRC is computed on the new flash content and is compared with a CRC in the flash file header. If this is coincident, the new information designed to be the next flash content is proper and correct and error-free. The system is basically ready for update.

Memory usage, for example flash memory usage, is detached 310 from applications to allow for updates such as flash updates. By canceling all currently running execution scripts, which store the definition and actual order, in which applications are invoked, and by aborting all remaining programs running with the non-volatile memory being involved, considerable RAM space is freed, thereby entering a "restricted functionality" operation mode. For example, an ENTER FLASH STATE signal is sent to the initialization process to trigger the transition to the "flash" state of the system, i.e., to enter the above-mentioned restricted functionality mode needed to make temporarily the flash memory obsolete. This particular signal cancels any running execution scripts. In particular, the signal aborts all running processes except FSPInit and kernel threads. Thus, the flash memory is detached from DRAM and any other operational functionality and is temporarily obsolete for operational purposes. Of course, this is achieved at the expense of operational functionality. Thus, the embedded system continues to run, but its functionality from a user point of view is restricted to the essential basic functionality, i.e. the user applications for system management as mentioned in the above example are stopped, but the internal supervising functions like the Watchdog control application is restarted. A significant memory space in DRAM is freed by said abort operation.

A DRAM-based file system is temporarily created 320 by reusing the freed memory to create a DRAM-based file system that allocates volatile memory as needed for the non-volatile memory update process. This includes the mounting of the file system.

Procedural code for the update is copied 330 into the freshly generated RAM file system. For flash updates, the procedural code generally is copied from the non-volatile memory, or for example, via a network connection into the volatile memory. A particular example of the freshly generated RAM file system is a system watchdog program, which monitors system responsiveness, and the programs, libraries and execution scripts needed to update the flash partition. This further includes changing the system search paths to redirect the operating system to find files in the temporary RAM file system only.

The update procedure is executed 340. The update procedure includes copying a verified, updated non-volatile memory content to the non-volatile memory via a network transfer using an I/O interface to a network. In particular, a flash update program (FUP) can be executed to perform the non-volatile memory update. The FUP reads parts of or the complete new flash content through the functional network path. The FUP then writes this new flash content part to the partition using the functional flash device driver.

The system is rebooted 350 with the new updated content. For example, the result of a flash content update procedure is stored in a non-volatile memory location other than flash, for example, in SRAM or reset in persistent processor registers. An encoded non-volatile memory image may be loaded into the non-volatile memory.

The process illustrated with reference to FIGS. 2, 3b and 4 may be tangibly embodied in a computer-readable medium or carrier, e.g. one or more of the fixed and/or removable data storage devices 68 illustrated in FIG. 2, or other data storage or data communications devices. The computer program 90 may be loaded into the memory 12, or into the processor 11 to configure the embedded system of FIG. 2, for execution. The computer program 90 comprise instructions which, when read and executed by the processor 11 of FIG. 2, causes the processor to perform the steps necessary to execute the steps or elements of the present invention.

Accordingly, the present invention can be realized in hardware, software, or a combination of hardware and software. A tool, according to the present invention, can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and when loaded in a computer system, is able to carry out these methods.

Computer program means or computer program in the present invention mean any expression, in any language, code or notation, of a set of instructions intended to cause a system having an information processing capability to perform a particular function either directly or after either or both of (1) conversion to another language, code or notation; and (2) reproduction in a different material form.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device readable by a computer, the program storage device tangibly embodying one or more programs of instructions executable by the computer to perform operations for updating a non-volatile memory in an application environment of an embedded computing system, the operations comprising:

detaching the non-volatile memory from all expectable non-volatile memory references;

creating a temporary volatile-memory file system for allocation of volatile memory space as needed for the non-volatile memory update operations;

copying all procedural code required to perform the non-volatile memory update into memory space of the volatile memory allocated by the temporary volatile memory file system;

changing the operating system search path definitions pointing to memory space of the non-volatile memory, temporarily to point to memory space of the volatile memory allocated by the temporary volatile memory file system;

executing the procedural code in the volatile memory to perform the non-volatile memory update using the operating system search path definitions changed temporarily to point to the volatile memory; and after updating the non-volatile memory, changing the operating system search path definitions temporarily pointing to memory space of the volatile memory back to point to memory space of the non-volatile memory.

2. The program storage device of claim 1, wherein the non-volatile memory comprises one from the following: BIOS memory, an operating system, user data, program customization data and firmware.

3. The program storage device of claim 1, wherein detaching the non-volatile memory from all expectable non-volatile memory references comprises canceling a set of running execution scripts in which applications are invoked and aborting a set of remaining programs running involving the non-volatile memory.

4. The program storage device of claim 1, wherein creating a temporary volatile-memory file system for allocation of volatile memory space comprises creating a RAM-based file system for allocation of volatile memory space.

5. The program storage device of claim 1, wherein copying all procedural code required to perform the non-volatile memory update into the volatile memory comprises copying procedural code from non-volatile memory.

6. The program storage device of claim 1, wherein copying all procedural code required to perform the non-volatile memory update into the volatile memory comprises copying procedural code from a network connection into the volatile memory.

7. The program storage device of claim 1, wherein performing the non-volatile memory update comprises copying a verified and updated non-volatile memory content to the non-volatile memory via a network transfer using an I/O interface to a network.

8. The program storage device of claim 1, further comprising loading an encoded non-volatile-memory image into the non-volatile memory.

9. A device for updating a non-volatile memory in an application environment of an embedded computing system comprising:

a memory for storing data therein; and a processor and a program storage device tangibly embodying one or more programs of instructions executable by the processor to perform operations, the operations comprising:

detaching the non-volatile memory from all expectable non-volatile memory references, creating a temporary volatile-memory file system for allocation of volatile memory space as needed for the non-volatile memory update operations, copying all procedural code required to perform the non-volatile memory update into memory space of the volatile memory allocated by the temporary volatile memory file system, changing the operating system search path definitions pointing to memory space of the non-volatile memory, temporarily to point to memory space of the volatile memory allocated by the temporary volatile memory file system;

executing the procedural code in the volatile memory to perform the non-volatile memory update using the operating system search path definitions changed temporarily to point to the volatile memory; and after updating the non-volatile memory, changing the operating system search path definitions temporarily pointing to memory space of the volatile memory back to point to memory space of the non-volatile memory.

10. The device of claim 9, wherein the processor is further configured to receive update data over a TCP/IP based network.

11. The device of claim 9, wherein the processor performs the non-volatile memory update using flash memory.

12. The device of claim 9, wherein detaching the non-volatile memory from all expectable non-volatile memory references comprises canceling a set of running execution scripts in which applications are invoked and aborting a set of remaining programs running involving the non-volatile memory.

13. The device of claim 9, wherein creating a temporary volatile-memory file system for allocation of volatile memory space comprises creating a RAM-based file system for allocation of volatile memory space.

14. The device of claim 9, wherein copying all procedural code required to perform the non-volatile memory update into the volatile memory comprises copying procedural code from non-volatile memory.

15. The device of claim 9, wherein copying all procedural code required to perform the non-volatile memory update into the volatile memory comprises copying procedural code from a network connection into the volatile memory.

16. The device of claim 9, wherein performing the non-volatile memory update comprises copying a verified and updated non-volatile memory content to the non-volatile memory via a network transfer using an I/O interface to a network.

17. The device of claim 9, wherein the operations further comprise loading an encoded non-volatile-memory image into the non-volatile memory.

18. A system for updating a non-volatile memory in an application environment of an embedded computing system, comprising:

means for detaching the non-volatile memory from all expectable non-volatile memory references;

means for creating a temporary volatile-memory file system for allocation of volatile memory space as needed for the non-volatile memory update operations;

means for copying all procedural code required to perform the non-volatile memory update into memory space of the volatile memory allocated by the temporary volatile memory file system;

means for changing the operating system search path definitions pointing to memory space of the non-volatile memory, temporarily to point to memory space of the volatile memory allocated by the temporary volatile memory file system;

means for executing the procedural code in the volatile memory to perform the non-volatile memory update using the operating system search path definitions changed temporarily to point to the volatile memory; and after updating the non-volatile memory, means for changing the operating system search path definitions temporarily pointing to memory space of the volatile memory back to point to memory space of the non-volatile memory.

* * * * *